FIG. I

INVENTORS:
PHILIP J. BROWNSCOMBE
MANUEL DELGADO
ATT'YS

INVENTORS:
PHILIP J. BROWNSCOMBE
MANUEL DELGADO
BY Maryall, Johnston, Cook & Root
ATT'YS June 15, 1965  P. J. BROWNSCOMBE ETAL  3,188,910
PROJECTOR VIEWER AND IMAGE SCANNING ASSEMBLY THEREFOR
Filed June 25, 1962  3 Sheets-Sheet 3

INVENTORS:
PHILIP J. BROWNSCOMBE
MANUEL DELGADO
BY *Maxwell, Johnston, Cook & Root*
ATT'YS

United States Patent Office 3,188,910
Patented June 15, 1965

3,188,910
PROJECTOR VIEWER AND IMAGE SCANNING
ASSEMBLY THEREFOR
Philip J. Brownscombe, Millington, N.J., and Manuel Delgado, New York, N.Y., assignors to Eugene Dietzgen Co., Chicago, Ill., a corporation of Delaware
Filed June 25, 1962, Ser. No. 204,769
9 Claims. (Cl. 88—24)

This invention, in general, relates to projection of an image on a film or other transparent sheet, a feature of which invention relates to scanning of the image for selectively viewing the desired portion of the image. The viewing device or reader of the invention and its scanning assembly is especially designed for convenient viewing of microfilm, which may be mounted in standard electric accounting machine size aperture cards.

Special types of large viewers or readers are known in the art. These large viewers are generally designed to show the entire area of the microfilm image on the screen at one time. In many cases this is desirable, but there are instances where readers with large viewing screens are too cumbersome for convenient use. For several years the need has been recognized for a small viewing device or reader which will project an image of sufficient size to be easily studied onto a small screen. We have provided a viewing device or reader which will project an image of sufficient size onto a small screen by providing that the image from the microfilm or transparent sheet projected onto the screen is only a fractional area of the complete area of the image.

For example, where drawings are recorded on microfilm, the image size on the screen should be at least half of the linear size of the original drawing for satisfactory review of the drawing by a draftsman, engineer, etc. Unless an abnormally large screen is used, it is not possible to shown a large drawing, 36" x 48" for example, on a small screen in its entirety. Therefore, in viewing devices or readers having a relatively small screen, a mechanism for scanning the image over the screen area to select the desired portion thereof to be studied is necessary. The mechanism for scanning is important because the readiness with which the user can bring various portions of the image into view on the screen determines to a large extent the utility of the reader or viewing device.

There has been disclosed in the application of Philip J. Brownscombe, Serial No. 151,473, filed November 10, 1961, the disclosure of which is herein incorporated by reference as it had been set forth in its entirety, a scanning mechanism which permits the image to be moved back and forth, from side to side, or in any diagonal direction quickly and easily in one motion of the handle operating the scanning mechanism. One of the features of the reader of the aforesaid application is the use of a linkage which prevents rotation of the image as it is moved in the scanning procedure. Briefly, the linkage which is used in the aforesaid application to permit translation of the image in any direction without rotation thereof consists of two parallel motion linkages at right angles. An L-shaped member is connected to the reader frame by two short links of equal lengths. This L-shaped member can move in arcuate motion relative to the frame, but cannot rotate relative thereto. A second set of short links of equal lengths connects a plate on which is carried the microfilm or other transparent image-containing sheet to the shorter arm of the L-shaped member. These two parallel motion linkages at angles to each other permit the microfilm or transparent sheet to be moved in any direction relative to the frame, but do not permit rotation thereof.

The microfilm or other transparent sheet containing the image, or a card bearing them, is held in the aforesaid application between glass pressure plates to insure flatness of the film or sheet. For convenience in one-handed operation, the upper plate is mounted in a yoke having a pair of toggle springs which cause the yoke and the upper glass plate to stay either up when raised or down when lowered against the microfilm or lower plate.

The viewing devices and readers of this invention operate in a similar manner to the readers of the aforesaid application. This invention, however, provides a different type of parallel movement linkage by which the image can be moved back and forth, from side to side or in any diagonal direction without rotation of the image. There are further changes or modifications in the cabinet layout, the glass pressure plate assembly, the specific reflecting mirror arrangement, and other aspects. Briefly, the viewing devices or readers of the invention comprise a light source which projects its light through a transparent holding means for the image-containing sheet or film into a focusing lens. The image is reflected by a mirror system inside the cabinet of the viewing device or reader on a self-contained screen. The projected image is enlarged to a size sufficient to be conveniently read or studied on the screen.

The light source and focusing lens are stationary, while the transparent holding means and the image-containing film held thereby are movable in any linear direction without rotation thereof. This movement is achieved by manual movement of a handle connected to a motion translation means which, in turn, is connected to a movable plate carrying the transparent holding means. The movable plate is slidable on a fixed plate and the two plates are connected by a T-bar with one leg of the T being longitudinally slidably connected with one plate and the other leg of the T being slidably connected in a transverse direction to the other plate. One of the convenient features of this scanning mechanism invention is that the movement of the image on the screen is in the same direction as movement of the handle by which the scanning assembly is operated. For example, if the handle is moved vertically upwardly, the image on the screen is shifted upwardly. If the handle is moved to the left, the image on the screen is shifted to the left. Similar corresponding movements between the handle and the image on the screen are achieved by movement of the handle in other directions, including the diagonal directions.

One of the primary objectives and advantages of the viewing devices or readers of the invention lies in the simplicity of construction of the scanning assembly which adapts the viewing device or reader to provide a projection onto a small screen of an image of sufficient size to be read or studied coupled with a convenient scanning mechanism by which selected segments of the total image on a film or transparent sheet can be positioned and studied on the screen. The scanning assembly is made of parts which can be made and assembled at a relatively low cost and is essentially foolproof in operation. Other objectives and features of the invention include the reflecting mirror assemblies by which the image is folded in the cabinet in its reflection between the focusing lens and the screen and the adjustable-position mounting of a mirror in the cabinet. Another feature lies in the mounting of the upper glass pressure plate in a frame assembly whereby the upper plate will press flatly against the image-containing sheet or film or card carrying same when the upper plate is lowered against the image-containing film or sheet or card carrying same, the latter resting on the lower plate. Other objectives, features and advantages of the invention will be described hereafter.

These and other advantages of the invention may be achieved by reader or viewing device construction following the generic principles of the invention herein described. These principles are further illustrated and the specific embodiment of the invention shown in the drawings wherein.

Figure 1:
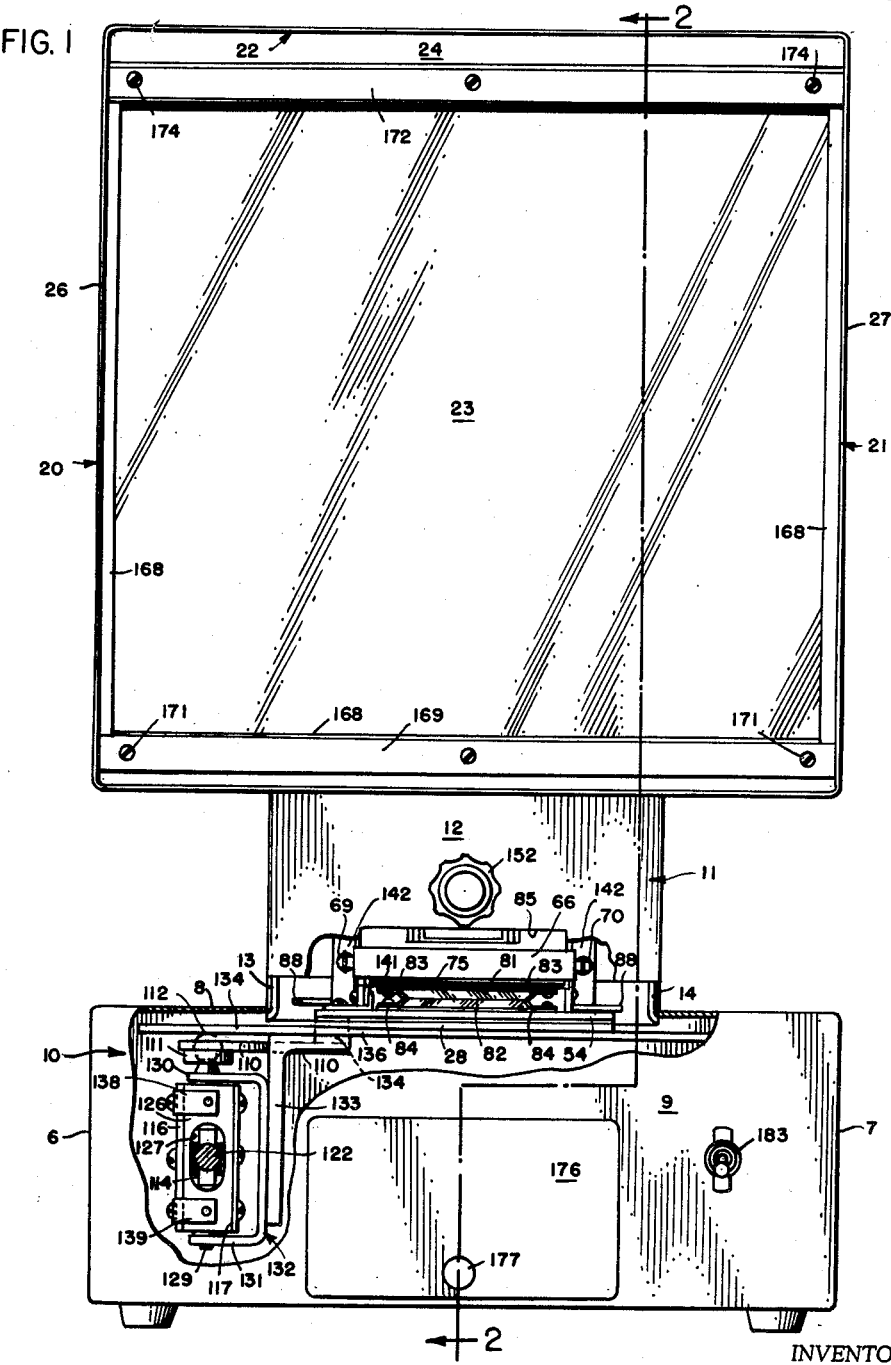
FIG. 1 is a front elevation of the embodiment with portions of the front walls of the cabinet broken away to facilitate illustration of the invention.
Figure 2:
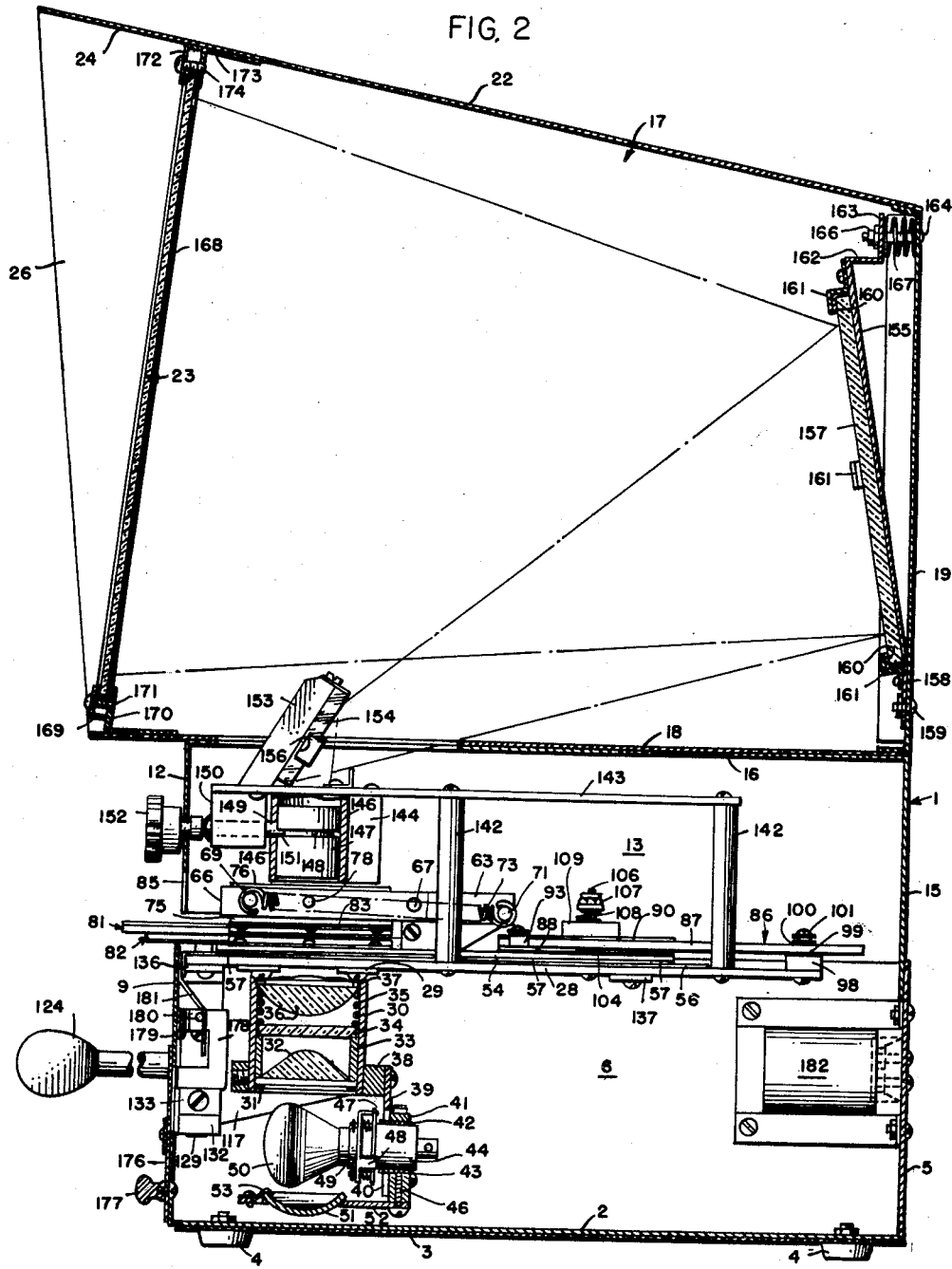
FIG. 2 is a side elevation of the embodiment showing a cross-section taken on section 2—2 of FIG. 1.

The embodiment of the invention comprises a cabinet or housing 1 made of a bottom wall 2 mounted on a base plate 3 having foot pads 4, a rear wall 5, side walls 6, 7, a top wall 8 and a front wall 9. These walls make up a base section 10 of the cabinet 1 and form a housing for a lamp, condenser lenses, and a part of a scanning mechanism.

There is mounted in the top wall 8 of the base section 10 a compartment 11 made up of a front wall 12, side walls 13, 14, a rear wall 15 and a top wall 16. The compartment 11 is open at its bottom end and communicates with the top of the base section 10. It houses the remainder of the scanning assembly, the glass pressure plates mounted on the scanning assembly and the focusing lens.

Situated on the top of the compartment 11 is a compartment 17 in which is mounted the mirror system for folding the projected image path and the screen onto which the image is projected. The compartment 17 is made of a bottom wall 18 attached to the top wall 16 of compartment 11, a rear wall 19, side walls 20, 21 and top wall 22. Extending across the front face of the compartment 17 at a sloping angle is the translucent screen 23 onto which the image is projected. This screen is shielded from direct light above and to the sides of the viewing device by a hood made up of the top wall extension 24 and side wall extensions 26, 27 which project beyond the face of the screen 23.

There is mounted in the upper portion of the base section 10 a horizontal, fixed plate 28. A condenser lens barrel or cylinder 30 is mounted on the underside of the plate 28 by screws extending through brackets 29. An annular ring 31 is fixedly mounted in the lower end of the barrel 30, on which ring is supported the lower lens 32 of the condenser lens assembly. The barrel 30 also contains a hollow cylinder 33 on which rests the planar glass plate 34. Helical spring 35 rests on the upper surface of the glass plate 34, and the upper end of the spring presses against the outer edge of the upper lens 36 and presses against the annular ring 37 at the upper end of the barrel. This provides the condenser lens system for condensing a light for projection through the image-containing film as hereinafter described.

There is mounted about the lower end of the barrel 30 an annular ring 38 held on the barrel by a set screw or screws. The ring 38 carries a vertically disposed, flat plate 39 having a vertical slot 40 therein, a lamp assembly mounting plate 41 attached by screws to the plate 39. The mounting plate 41 has a round aperture therein in which is mounted a ring collar 42 having a longitudinal slot 43. The ring collar 42 carries the cylindrical base 44 of the lamp assembly. A pin 46 is positioned in a vertical hole drilled from the bottom of the mounting plate 41. This pin has its end positioned in the longitudinal slot 43 of the ring collar 42 to prevent rotation thereof.

The cylindrical base 44 extends through the vertical slot 40 and bears a ring 47 on which a spring-mounted disc plate 48 is carried. The disc plate 48, in turn, carries the electrical socket 49 for the incandescent lamp bulb 50. The spring mounting of the lamp socket dampens shocks resulting from accidental jarring of the viewing device to protect the delicate filament or filaments on the lamp 50.

Immediately below the lamp 50 there is provided a concave, polished reflector 51 supported on a horizontal support plate 52 and held thereon by means of a clip member 53. The plate 52 is attached to the bottom edge of the mounting plate 41 by screws. The foregoing description sets forth the essential features of the lamp and condenser lens structure.

The scanning assembly is made up of a flat plate 54 which is slidable on the fixed plate 28, a parallel movement-type linkage which allows the plate 54 to slide in a longitudinal, lateral or diagonal direction without rotation of the plate 54, and a linkage by which the sliding motion is imparted to the plate 54 by a handle. In order to decrease the friction between plates 28 and 54, plate 28 has a plurality of Teflon strips 56 mounted on the upper surface and extending longitudinally beneath the plate 54. The plate 54 carries on its undersurface a plurality of Teflon strips 57 extending transversely of the plate 54.

Figure 3:
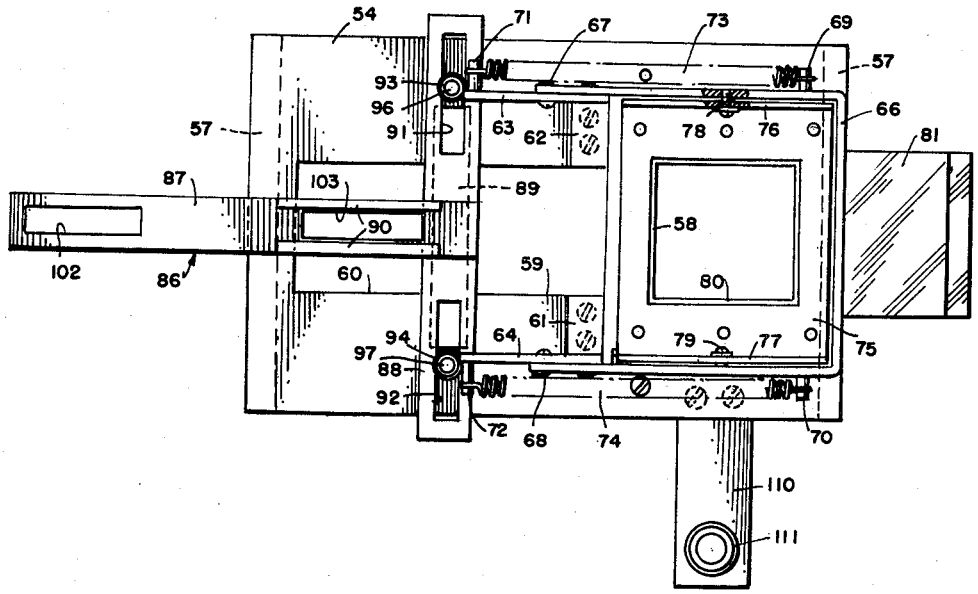
FIG. 3 is a top plan view of the movable plate with the T-bar assembly mounted thereon and with the upper glass holding frame mounted thereon.

As is shown in FIG. 3, the slidable plate 54 has three rectangular openings 58, 59 and 60. The purpose of the rectangular opening 58 is to allow the light projected from the lamp through the condenser lenses to pass through the plate 54. Rectangular openings 59, 60 are provided to clear structural parts extending into or through the plate 54 and which would otherwise bind the sliding movement of the plate 54 on the fixed plate 28. Attached to the upper side of the plate 54 by screws are a pair of bars 61, 62 positioned on opposite sides of the opening 59. The bars 61, 62 have mounted thereon and extending rearwardly therefrom plates 63, 64. The plates 63, 64 are mounting plates for the U-frame 66, the rearward ends of which are pivotally supported on the plates 63, 64 on pins 67, 68. The U-frame 66 is thus pivotable in a vertical direction with respect to plate 54.

There is provided on the sides of the U-frame 66 near the forward edge thereof a pair of fixed pins 69, 70. A similar pair of fixed pins 71, 72 are mounted on the rearward ends of the plates 63, 64. These pins are the mounting pins for tension springs 73, 74 extending along each side of the U-frame 66. The function of these springs is to provide a toggle action in which U-frame 66 is held in its raised position when raised and held in its lower position when lowered.

U-frame 66 carries a plate 75. The plate 75 has upstanding side walls 76, 77. The side walls 76, 77 each have an aperture in the mid-portion thereof through which extend screws 78, 79 threadedly mounted in the sides of the U-frame 66. The screws 78, 79 function as pins which pivotally support the plate 75. The plate 75 has a rectangular opening 80 to allow the projected light to pass through the plate 75.

There is mounted on the underside of the plate 75 an upper, transparent plate 81, preferably made of glass of optical quality. The upper plate 81 rests flatly on a flat transparent plate 82, also preferably made of glass of optical quality. The upper plate 81 is mounted on the undersurface of the plate 75 by the use of metal clips 83, while the lower plate is mounted on the movable plate 54 by similar metal clips 84. The plates 81, 82 are used as clamp plates to hold the image-containing transparent sheet or film, or a card carrying the same, flatly between the plates. Because of the pivotal mounting of the plate 75 on the screws 78, 79, the upper plate 81 will rest flatly against lower plate 82 or the image-containing sheet or film or card carrying the same, when it is lowered and brought into clamping relationship under the action of toggle springs 73, 74. The upper plate is raised for insertion of the image-containing sheet or film, or card carrying the same, between the plates by exerting an outward pressure on the U-bar 66. After the image-containing material is inserted between the plates in the proper position, the U-bar 66 is pressed downwardly to bring the plates into clamping relationship. In order to provide sufficient access of the hand to perform these functions, the front wall 12 of the compartment 11 has an inverted T-opening 85 in its lower end.

The parallel movement-type linkage which allows the movable plate 54 to slide on the fixed plate 28 in any direction without relative rotation between these plates comprises a T-bar 86 made up of a leg 87 to which is attached a cross leg 88. The cross leg 88 slides on a Teflon strip 89 mounted on the upper surface of the plate 54. The leg 87 has a pair of narrow Teflon strips 90 mounted on opposite sides of the longitudinal slot 103 for a purpose later described.

The cross leg 88 has on opposite ends thereof rectangular slots 91, 92 running parallel to the length of the cross leg 88. There rides in contact with the side walls of the slots 91, 92 rollers 93, 94 rotatably journalled on vertical shafts 96, 97 mounted on the movable plate 54. The T-bar 87 thus is movable in a lateral direction with respect to the plate 54 within the limits of the ends of the slots 91, 92.

Mounted on the rearward end of the fixed plate 28 is a bar 98 to the upper surface of which is attached, beneath the leg 87, a Teflon piece 99 so that the leg 87 is easily slidable on the bar 98. The bar 98 carries a roller 100 rotatably journalled on a shaft 101 mounted on the bar 98. This roller rides in the longitudinal, rectangular slot 102 in the rearward end of the leg 87 of the T-bar 86 in a manner similar to the relationship between rollers 93, 94 and slots 91, 92. The leg 87 has a second longitudinal, rectangular slot 103 forwardly of the slot 102. A second roller 104 mounted on a shaft 106 attached to the fixed plate 28 rides in the slot 103. The shaft 106 has a threaded end on which is threadedly mounted a nut 107 beneath which is positioned a helical spring 108 which presses against a pressure bar 109 riding on the Teflon strips 90 on opposite sides of the slot 103 of the leg 87 of the T-bar 86. The pressure exerted by the spring 108 on the pressure bar 109 can be adjusted by turning the nut 106. The function of the pressure bar is to keep the T-bar 86 from being accidentally displaced off the rollers 93, 94, 100 and/or 104.

The T-bar functions to restrict the motion of the plate 54 on the fixed plate 28 to a sliding motion without relative rotation between the plates. By keeping the play between the side walls of the slots in the T-bar and the sides of the respective rollers at a minimum, the amount of rotational play of the two plates can be essentially eliminated. When the plate 54 is moved in a forward or rearward direction, the plate 54 and the T-bar move together. When the plate 54 is moved in a sideward or a lateral direction, there is a relative movement between plate 54 and T-bar 86. When the plate 54 is moved in a diagonal direction, there is a relative movement between the T-bar 86 and the plate 54 and also a relative movement between T-bar 86 and the fixed plate 28.

Figure 4:
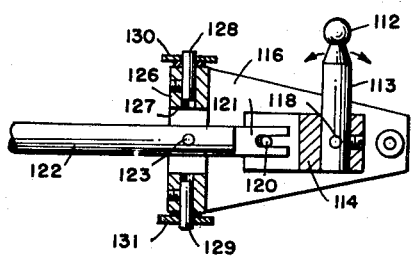
FIG. 4 is a side elevation in cross-section of the linkage connecting the operating handle and the movable plate of the embodiment, which cross-section is taken on section 4—4 of FIG. 5.
Figure 5:
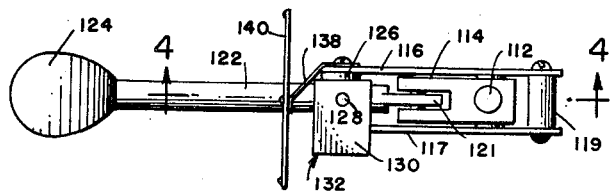
FIG. 5 is a top plan view of the mechanism of FIG. 4.

The motion imparted to the plate 54 is conveyed thereto by a force imparted to the side arm 110 carried on the underside of plate 54. The side arm 110 has a ball socket 111 in which is seated a ball 112 on the upper end of a rod 113. Movement of the rod 113 and its ball 112 is provided by the linkage which can be seen in detail in FIGS. 1, 4 and 5.

The rod 113 is mounted by a set screw in a forked head 114. The forked head 114 is rotatably supported between a pair of side plates 116, 117 in which are rotatably mounted a pivot pin 118 extending transversely through the forked head 114 and the pin 113. The side plates 116, 117 are connected together at their forward ends by a rod 119.

Extending between the forked arms of the forked head 114 is a fixed pin 120 over which is positioned the forked end 121 of a shaft 122 having a handle 124. The shaft 122 is pivotally supported for vertical pivotal movement thereof on a shaft 123 mounted in the side walls of an opening 127 in a cross bar 126, to which are attached the side walls 116, 117. There is fixedly positioned on the cross bar 126 by set screws a pair of vertical pins comprising the upper pin 128 extending from the upper end of the cross bar and a lower pin 129 extending from the lower end of the cross bar. These pins are rotatably mounted in the upper and lower horizontal arms 130, 131 of a U-bracket 132. The cross bar 126 and the parts carried thereby are thus pivotable about a vertical axis in the U-bracket 132, while the shaft 122 is pivotable about a horizontal axis in the cross bar 126.

The U-bar 132 is fixedly positioned in the viewing device by the mounting thereof on an L-bar 133. The L-bar 133 is attached to a fixed frame bar 136 extending across the front of the upper side of the base section 10. The frame bar 136 also supports the forward end of the fixed plate 28. The plate 28 is also supported by a rear frame bar 137.

The side arm 110 is connected to the movable plate 54 through a bar 134 attached to both of these members. A motion in any direction imparted through the ball and socket connection 111, 112 to the side arm 110 is transmitted to the movable plate 54.

There may be mounted on the side plate 116 a pair of spring plates 138, 139 which are attached to a flat disc 140. This disc 140 rests against the inner side of the front wall 9 about the handle shaft 122. It covers a hole (not shown) in the front wall 9, which hole is of sufficient size to allow the shaft 122 to be pivoted in any direction from its center position.

When the handle 124 is pushed downwardly or upwardly, the shaft 122 pivots about its pin axis 123. This pivotal movement, in turn, causes the forked head 114 carrying the post 113 to pivot about its pin axis 118. This causes the ball 112 to move in an arcuate path about the axis 118 and thus imparts either a forward or rearward motion to the arm 110 and the plate 54. If the handle 124 is moved sideways, the entire linkage shown in FIG. 4 pivots about the vertical axis through the pins 128, 129. This causes the post 113 and its ball 112 to swing about the vertical axis through the pins 128, 129 and imparts a sideward motion to the arm 110 and the plate 54. If the handle 124 is moved in a diagonal direction, the resultant motion is a combination of the two motions previously described with the result that the arm 110 and the plate 54 have imparted thereto a diagonal motion. One of the convenient features of the scanning mechanism is the fact that the movement of the image projected on the screen 23 corresponds to the direction of movement of the handle 124 when the microfilm or other transparent sheet material, or a card carrying the same, is properly positioned between the plates 81, 82 with the sides thereof parallel with the edges of the plate 54. The proper positioning of the image-containing sheet is facilitated by the L-bracket 141 mounted on the movable plate 54 at one side of the glass plates 81, 82. The vertical leg of this L-bracket serves as an abutment against which the edge of the image-containing sheet is positioned.

There is mounted on the outer edges of the fixed plate 28 four posts 142 on top of which is supported a frame plate 143. The frame plate 143 has attached to its underside a support bar 144 on which is mounted the frame 146 supporting the barrel 147 of the focusing lens. The barrel 147 is slidable in the frame 146 in a vertical direction. It has an annular groove 148 in which rides a radially offset pin 151 mounted on the end of a shaft 149. The shaft 149 is rotatably journalled in a journal bar 150 supported on the underside of the frame plate 143 and is turned by rotating the knob 152. By rotating the shaft, the offset pin 151 is orbited and, by virtue of its position in the groove 148, raises and lowers the lens barrel 147.

The light projected from the lamp 50 through the condenser lens system in the lens barrel 30, the transparent plates 81, 82 and the image-containing sheet therebetween is transmitted from the focusing lens in the lens barrel 147 onto a planar, first surface mirror 154 mounted immediately above the lens barrel 147. The planar mirror 154 is supported at a sloping angle on a sloping bar 153 attached to the upper side of the frame plate 143. The mirror 154 is held on the bar 153 by means of clip plates 156. The image is reflected from the planar mirror 154 to a second planar, first surface mirror 157 and is, in turn, reflected from this second mirror to the screen 23. The second planar mirror 157 is of a larger size than the first mirror 154 because the reflected image enlarges as it travels in the folded image path in the compartment 177. The mirror 157 is mounted on a plate 155. The plate 155 has a lower edge 158 which is parallel with a rear wall 19. This lower edge is attached to the rear wall 19 by means of screws 159. The edges of the mirror 157 have L-channels 160 thereabout over which is mounted the mounting brackets 161 to hold the mirror 157 on the plate 155.

The upper end of the plate 155 has a rearwardly offset bend 162 and a vertically disposed upper edge 163. The upper edge 163 has one or more screws 164 extending therethrough, on which screws are threaded a nut 166. The upper edge 163 is held between the nut 166 and a helical spring 167. The annular position of the mirror 157 can be adjusted by tightening or loosening the nut 166 to draw the upper edge 163 of the plate 155 toward or away from the rear wall 19 and thus cause the plate 155 to pivot about its lower edge.

The translucent screen 23 has a peripheral U-channel frame 168. The frame is mounted in position across the front of the compartment 17 by means of an L-bracket 169 which holds a lower edge of the U-frame 168 against the side of an L-plate 170 mounted on the bottom wall 18 of compartment 17. The L-bracket 169 is attached to the L-plate 170 by means of screws 171. The upper edge of the U-frame is similarly held by means of L-bracket 172, L-plate 173 mounted on top wall 122 and screws 174.

The front wall 9 of the base section 10 has a door 176 hingedly mounted thereon. This door may be swung upwardly by pulling on handle 177 to provide access to the lamp 50 for the purpose of replacing a defective lamp. The door is hinged for swinging about a horizontal axis above the door by means of a pair of U-plates 178 having one leg attached to the door and the other leg attached to the swinging plate of a hinge 179 which, in turn, is mounted on the inner side of the front wall 9. The U-plates 178 have a projecting pin 180 against which rests a side of an offset leaf spring 181. The leaf spring 181 presses against the pin 180 and provides a pressure on the hinge structure to keep the door 76 closed.

Electrical wiring for the lamp 50 is conventional and has not been shown in detail. The lamp circuit includes, however, a transformer 182 and an on-off switch 183 mounted on the rear wall 5 and the front wall 9, respectively, of the base section 10.

The foregoing constitutes but one embodiment of the principles of our invention. Other modifications and variations may be employed without departing from the spirit and scope of the invention and the principles thereof, which invention is set forth in the following claims.

The invention is hereby claimed as follows:

1. An image scanning assembly comprising holding means for holding an image-containing sheet, a fixed plate, a second plate slidable on said fixed plate, nonrotatable linking means slidably coacting with said fixed plate and said second plate by which said second plate may be moved in its plane in all directions relative to said first plate, said linking means precluding relative rotation between said second plate and said fixed plate in said plane during the aforesaid movement of said second plate relative to said fixed plate, and said holding means being mounted on said second plate and movable therewith, said linking means further comprising a member having rigidly-connected legs extending in two directions at right angles to each other, means on said fixed plate coacting with a leg of said member extending in one of said two directions to provide a slidable, nonrotatable movement of said member relative to said support means in said one of said two directions, and additional means on said second plate coacting with a leg of said member extending in the other of said two directions to provide a slidable, nonrotatable movement of said second plate relative to said member in said other of said two directions.

2. An image scanning assembly comprising holding means for holding an image-containing sheet, support means, a plate slidably supported on said support means, a T-bar consisting of a first leg and a cross leg at right angles to each other with longitudinal slots in said legs, first and second means mounted on said support means and extending into said slots in one of said legs in contact with the sides of said slots, third and fourth means mounted on said plate and extending into said slots of the other of said legs, said first and second means coacting with the sides of said slots in said one of said legs to permit relative movement between said T-bar and said support means in one linear direction and precluding relative rotation thereof, said third and fourth means coacting with the sides of said slots in said other of said legs to permit relative movement between said plate and said T-bar in another linear direction at right angles to said one linear direction and precluding relative rotation thereof and said holding means being mounted on said plate.

3. An image scanning assembly as claimed in claim 2 wherein said first and second means and said third and fourth means each are rollers which are mounted on said support means and said plate, respectively, and are positioned in said slots.

4. A projector viewer comprising a cabinet, a viewing screen mounted on said cabinet, light projection means in said cabinet, holding means for holding an image-containing sheet in the light projection path of said light projection means, a fixed plate in said cabinet, a second plate slidable on said fixed plate, linking means coacting with said fixed plate and said second plate by which said second plate can be moved in its plane in all directions relative to said first plate, said linking means precluding relative rotation between said second plate and said fixed plate in said plane during the aforesaid movement of said second plate relative to said fixed plate, said holding means being mounted on said second plate and movable therewith, means to project the image in said holding means onto said screen, a handle mounted on and extending outwardly from the same side of said cabinet as the side on which said screen is mounted, means pivotally supporting said handle for universal pivotal movement thereof, and means connecting said last-mentioned means and said second plate and coordinated with said means to project the image so that the image projected on said screen moves in the same direction as the direction of movement of said handle.

5. A projector viewer comprising a cabinet, a viewing screen mounted on said cabinet, light projection means in said cabinet, holding means for holding an image-containing sheet in the light projection path of said light projection means, a fixed plate in said cabinet, a second plate slidable on said fixed plate, linking means coacting with said fixed plate and said second plate by which said second plate can be moved in its plane in all directions relative to said first plate, said linking means precluding relative rotation between said second plate and said fixed plate in said plane during the aforesaid movement of said second plate relative to said fixed plate, said holding means being mounted on said second plate and movable therewith, means to project the image in said holding means onto said screen, a U-bracket fixedly mounted in said cabinet, the legs of said U-bracket extending horizontally, a member supported in and between said legs of said U-bracket for pivotal movement about a vertical axis, a handle shaft, means pivotally supporting said shaft at an intermediate point along said shaft on said member for pivotal movement of said shaft about a horizontal axis, plate means extending outwardly from said member adjacent one end of said shaft, a vertical pin pivotally supported in said plate means on a horizontal pivot axis, means pivotally joining said end of said shaft and said pin whereby said pin is pivoted about its horizontal axis when said shaft is pivoted about its horizontal axis, said pin orbiting about said vertical aixs when said member and said shaft are pivoted about said vertical axis, and means including a swivel connection joining the upper end of said pin and said second plate whereby said second plate moves in its plane on said first plate with the movement of the upper end of said pin.

6. A scanning assembly comprising support means, a plate supported on said support means, linking means slidably coasting with said support means and said plate by which said plate can be moved in its plane in all directions relative to said support means, said linking means precluding relative rotation between said plate and said support means in said plane during the aforesaid movement of said plate relative to said support means, a fixed U-bracket, the legs of said U-bracket extending horizontally, a member supported in and between said legs of said U-bracket for pivotal movement about a vertical axis, a handle shaft, means pivotally supporting said shaft at an intermediate point along said shaft on said member for pivotal movement of said shaft about a horizontal axis, plate means extending outwardly from said member adjacent one end of said shaft, a vertical pin pivotally supported in said plate means on a horizontal pivot axis, means pivotally joining said end of said shaft and said pin whereby said pin is pivoted about its horizontal axis when said shaft is pivoted about its horizontal axis, said pin orbiting about said vertical axis when said member and said shaft are pivoted about said vertical axis, and means including a swivel connection joining the upper end of said pin and said plate whereby said plate moves in its plane on said first plate with the movement of the upper end of said pin.

7. A projector viewer as claimed in claim 5 wherein said means to project the image in said holding means onto said screen comprises a focusing lens immediately above said holding means in said light projection path, a small planar mirror immediately above said focusing lens, the mirror surface sloping upwardly and toward the rear of said cabinet, a larger planar mirror mounted at the rear of said cabinet in a position to receive the light reflected from said small mirror and in turn reflect the light to said screen, which is a translucent screen mounted on the front of said cabinet, and the end of said handle shaft which is opposite said one end projecting outwardly from the front of said cabinet.

8. A projector viewer as claimed in claim 4 wherein said handle is connected with said second plate by means which causes said second plate to move away from said side of said cabinet on which said screen is mounted when said handle is moved downwardly and toward said side of said cabinet when said handle is moved upwardly, said means further causing said second plate to move sidewardly in a direction opposite to said sideward movement of said handle, and said means to project the image onto the screen comprises a focusing lens immediately above said holding means in said light projection path, a small planar mirror immediately above said focusing lens, the mirror surface sloping upwardly and toward the rear of said cabinet, a larger planar mirror mounted at the rear of said cabinet in a position to receive the light reflected from said small mirror and in turn reflect the light to said screen, which is a translucent screen.

9. A projector viewer comprising a cabinet, a viewing screen mounted on said cabinet, light projection means in said cabinet, holding means for holding an image-containing sheet in the light projection path of said light projection means, supporting means in said cabinet supporting said holding means for movement in all directions in a horizontal plane, linking means coacting with said supporting means to preclude rotation of said holding means during said movement in said horizontal plane, means to project the image in said holding means onto said screen, a handle mounted on and extending outwardly from the same side of said cabinet as the side on which said screen is mounted, means pivotally supporting said handle for universal pivotal movement thereof, and means connecting said last-mentioned means and said supporting means and coordinated with said means to project the image so that the image projected on said screen moves in the same direction as the direction of movement of said handle.

References Cited by the Examiner
UNITED STATES PATENTS

| | | | |
|---|---|---|---|
| 1,798,724 | 3/31 | Chalmers | 74—471 |
| 1,943,508 | 1/34 | Bauersfeld | 88—24 |
| 2,172,256 | 9/39 | Nagel | 88—24 |
| 2,501,453 | 3/50 | Rowe et al. | 88—24 |
| 2,701,979 | 2/55 | Pratt et al. | 88—24 |
| 2,746,344 | 5/56 | Pratt et al. | 88—24 |
| 3,063,181 | 11/62 | Daniels et al. | 40—79 |
| 3,072,013 | 1/63 | Pratt | 88—24 |

NORTON ANSHER, *Primary Examiner.*

EMIL G. ANDERSON, *Examiner.*